(12) United States Patent
Soulard et al.

(10) Patent No.: US 8,068,420 B2
(45) Date of Patent: Nov. 29, 2011

(54) TEMPORAL SLAVING DEVICE

(75) Inventors: Jean-Luc Soulard, Rennes (FR); Laurent Marie, Chartres de Bretagne (FR); Hubert Prioul, Guignen (FR); Xiaofeng Cao, Zhejiang Province (CN)

(73) Assignee: Thomson Licensing, Boulogne-Billacourt (FR)

( * ) Notice: Subject to any disclaimer, the term of this patent is extended or adjusted under 35 U.S.C. 154(b) by 520 days.

(21) Appl. No.: 10/593,526

(22) PCT Filed: Mar. 3, 2005

(86) PCT No.: PCT/EP2005/050937
§ 371 (c)(1),
(2), (4) Date: Jul. 24, 2007

(87) PCT Pub. No.: WO2005/093978
PCT Pub. Date: Oct. 6, 2005

(65) Prior Publication Data
US 2008/0013451 A1    Jan. 17, 2008

(30) Foreign Application Priority Data

Mar. 22, 2004 (FR) .................................... 04 02958
Jul. 1, 2004 (FR) .................................... 04 51383

(51) Int. Cl.
*H04J 1/16* (2006.01)
(52) U.S. Cl. ............... 370/230.1; 370/229; 370/230; 370/235; 370/503
(58) Field of Classification Search ........... 370/395.62, 370/229, 230, 230.1, 235, 503, 516–519
See application file for complete search history.

(56) References Cited

U.S. PATENT DOCUMENTS

| 5,311,178 | A | 5/1994 | Pan et al. | |
| 5,608,731 | A * | 3/1997 | Upp et al. | 370/516 |
| 5,966,387 | A * | 10/1999 | Cloutier | 370/516 |
| 6,339,597 | B1 | 1/2002 | Osaki | |
| 6,466,547 | B1 * | 10/2002 | Lim et al. | 370/241 |
| 6,661,810 | B1 * | 12/2003 | Skelly et al. | 370/516 |
| 6,675,314 | B1 * | 1/2004 | Yamada et al. | 713/600 |
| 7,756,233 | B2 | 7/2010 | Inoue et al. | |
| 2001/0000071 | A1 | 3/2001 | Nichols | |
| 2003/0169777 | A1 | 9/2003 | Fuse | |
| 2005/0152213 | A1* | 7/2005 | Akiyama et al. | 365/233 |
| 2007/0206645 | A1* | 9/2007 | Sundqvist et al. | 370/516 |

FOREIGN PATENT DOCUMENTS

JP    10-210019 A    8/1998
(Continued)

OTHER PUBLICATIONS

Search Report Dated April 12, 2005.

*Primary Examiner* — Hassan Kizou
*Assistant Examiner* — Ashil Farahmand
(74) *Attorney, Agent, or Firm* — Robert D. Shedd; Vincent E. Duffy; Joel M. Fogelson

(57) ABSTRACT

The invention relates to a device for temporal slaving in a packet data transmission network, each data packet comprising a time label, comprising means of temporary storage. According to the invention, the said device is such that:—the means of temporary storage have a storage capacity able to record data received for a predetermined time (IPDV) dependant on the characteristics of the network, the said device furthermore comprising—means for regenerating a local reception clock as a function of the time label of the incoming packets,—means for reading the data in the buffer memory at an instant dependent on the said predetermined time (IPDV) and on the regenerated local clock.

7 Claims, 6 Drawing Sheets

FOREIGN PATENT DOCUMENTS

| | | |
|---|---|---|
| JP | 11-177653 A | 7/1999 |
| JP | 2001-028537 A | 1/2001 |
| JP | 2001-177401 A | 6/2001 |
| JP | 2002-281077 A | 9/2002 |
| WO | WO 96/08115 | 3/1996 |
| WO | 2005/088888 A1 | 9/2005 |

* cited by examiner

TEMPORAL SLAVING DEVICE

This application claims the benefit, under 35 U.S.C. § 365 of International Application PCT/EP2005/050937, filed Mar. 3, 2005, which was published in accordance with PCT Article 21(2) on Oct. 6, 2005 in English and which claims the benefit of French patent application No. 0402958, filed Mar. 22, 2004 and French patent application No. 0451383, filed Jul. 1, 2004.

The invention relates to a temporal slaving device with limited drift.

The present invention relates more particularly to the transport of data in real time in internet type (IP) networks, between a sender terminal and a receiver terminal.

In transmission networks, the data are often subject to noise which often makes it difficult to reconstruct the digital stream at the receiver level.

The present invention is more particularly concerned with the temporal noise suffered by a data train and with the temporal repositioning of the packets in compliance with the temporal information transmitted by each of the packets, with a degree of accuracy satisfying the requirements of the receiving equipment.

A solution known to the person skilled in the art consists in slaving a phase locked loop directly to the temporal information received. Such a solution is unsuitable for particularly noisy environments since the variations induced in the transmission delay preclude the latching of the phase locked loop.

Another solution for clock recovery consists in driving a frequency synthesizer as a function of the level of fill of a buffer memory at the input of the reception device. This solution is unsuitable when the data throughput over the network is variable, and hence in particular in the case of the IP protocol.

The present invention proposes to resolve at least some of these drawbacks by proposing a device for temporal slaving in a packet data transmission network, each data packet comprising a time label, comprising means of temporary storage. According to the invention:
the means of temporary storage have a storage capacity able to record data received for a predetermined time dependant on the characteristics of the network,
the said device furthermore comprising
means for regenerating a local reception clock as a function of the time label of the incoming packets,
means for reading the data in the means of temporary storage at an instant dependent on the said predetermined time (IPDV) and on the regenerated local clock.

According to a preferred embodiment, the means of reading the data in the means of temporary storage are adapted for reading the data in the means of temporary storage when the difference between the said predetermined time and the regenerated local clock is positive.

According to a preferred embodiment, the means of regenerating the local clock are able to aggregate the discrepancies between the local reception clock for the data packets and the time labels of the data packets received between two instants dependent on the frequency of the local clock and the transmission clock for the data packets.

According to a preferred embodiment, the device comprises means of reducing the convergence time on start-up.

According to a preferred embodiment, the device comprises means of reducing the phase noise.

Advantageously, the means of reducing the phase noise comprise a digital low-pass filter.

According to a preferred embodiment, the device comprises means of generating artificial noise.

The invention also relates to a method of temporal slaving in a packet data transmission network, each data packet comprising a time label, the said method comprising a step of temporary storage (6) of the packets received from the said network and being characterized in that
during the storage step, the data are stored for a predetermined time (IPDV) dependant on the characteristics of the network,
the said method furthermore comprising
a step of regenerating a local reception clock as a function of the time label of the incoming packets,
a step of reading the data in the means of temporary storage at an instant dependent on the said predetermined time (IPDV) and on the regenerated local reception clock.

The invention will be better understood and illustrated by means of advantageous exemplary embodiments and implementations, which are in no way limiting, with reference to the appended drawings in which FIG. 1 represents an example network with receive and send modules, FIG. 2 represents a preferred embodiment of a device according to the invention FIG. 3 represents a preferred embodiment of a module for regenerating the local reception clock, FIG. 4 represents an improvement of the module for regenerating the clock making it possible to improve the latching time, FIG. 5 represents a module for estimating the propagation delay of the packets in the network, FIG. 6 represents an improvement of the module for regenerating the clock making it possible to minimise the phase noise, FIG. 7 represents a second example of the module for regenerating the clock making it possible to minimise the phase noise, FIG. 8 represents an exemplary low-pass filter used for the improvement of the phase noise, FIG. 9 represents an implementation of an artificial noise generator.

FIG. 10 represents a flow chart for comparing time values and accumulating differences between such time values.

The modules represented are functional units, which may or may not correspond to physically distinguishable units. For example, these modules or some of them may be grouped together into a single component, or constitute functionalities of one and the same piece of software. Conversely, certain modules may possibly be composed of separate physical entities.

The invention applies in a general manner to networks over which the data are transmitted in packets, whose data frames possess a time stamp. According to the preferred embodiment, the frames comply with the RTP protocol (the acronym standing for («real time protocol»).

FIG. 1 illustrates an example of network equipment comprising means 1 for transmitting a data stream and means 2 for adapting this stream so that it complies with the IP protocol. The means 2 transmit the IP data stream over an IP type network towards means 3 of IP adaptation which de-encapsulate the IP stream so as to produce a data stream that is comprehensible to means 4 for which the stream is destined.

The means 1 and 4 are, in the preferred embodiment, devices for coding and decoding MPEG type streams and especially MPEG-2 type streams.

The IP network 5 is a network over which the data packets may suffer very significant variations in delay. This gives rise to problems during the reception of the data packets by the equipment 4 which can no longer decode the data packets correctly. The temporal noise generated precludes reconstruction of the data stream in the receiving device 4.

FIG. 2 partially represents the module for adapting the data 3 at reception of an IP data stream.

The IP packets are received from the network 5 and loaded into a buffer memory 6, also called the means of temporary storage. The buffer memory 6 is for example a memory of FIFO type (the acronym standing for <<First-in First-out>>), intended to record the packets received from the IP network 5 as and when they are received in the receiving device 3.

The buffer memory 6 has a capacity dependent on the characteristics of the network 5. In particular, it is dependent on a parameter of the IP network 5 which is the maximum amplitude of the variation in transmission delay over the IP network 5.

This parameter (IPDV, the acronym standing for <<IP Delay Variation>>) is a constant and can be entered by the user for example or may be known to the various items of network equipment.

The packets received are also transmitted to a module 7, detailed in FIG. 3, which makes it possible to modify the local reception clock as a function of the relative drift of the oscillators at the sending and receiving ends (oscillator 8).

The module 7 for regenerating the reception clock must compensate for the actual frequency discrepancy between the local oscillator Tx, which is the time base oscillator Tx, responsible for delivering the values of the time labels inserted into the RTP packets on transmission, and the local oscillator Rx 8.

The module 7 therefore produces at output 13 a regenerated local time Rx. This regenerated local time is transmitted to a subtractor 9. The subtractor 9 calculates the difference between the IPDV delay referred to the local clock Rx and the value of the regenerated local time 13.

As a function of the result of this subtraction (signal 11), the data are read into the buffer memory 6. The module 10 transmits a read signal 12 to the buffer memory 6.

If the difference <<regenerated local time Rx minus IPDV>> is greater than the value of the time label of the next packet to be output from the buffer 6, then the data are read and the read signal 12 is activated.

Otherwise, the data are not read as long as this difference is not greater than the value of the time label of the next packet to be output from the buffer 6 and the read signal 12 is not activated.

FIG. 3 illustrates an embodiment of the module 7 for regenerating the local time Rx.

The module 7 comprises a differentiator 15 receiving as input on the one hand the time label of the incoming packet and on the other hand as feedback the regenerated local time Rx 13.

The differentiator 15 delivers at output 19 the difference between the time label and the regenerated local time Rx 13.

This difference is received by an accumulator 16. The accumulator 16 receives the instantaneous discrepancies 19 from the differentiator 15 and aggregates them.

The aggregate of the instantaneous discrepancies is transmitted to a decision taking automaton 17.

The decision taking automaton 17 instructs a regular update of the local time counter 18. The periodicity Tupdate of this update depends on the maximum possible discrepancy between the frequency of the local clock Rx and of the transmission clock Tx, this discrepancy being deduced from the technical characteristics of the oscillator components chosen for the two clocks. If the send oscillator Rx has an accuracy of +/−10 ppm and the receive oscillator has an accuracy of +/−5 ppm, then the maximum discrepancy between the two oscillators may be 30 ppm (i.e. +/−15 ppm relative).

In order to obtain the most regular possible regenerated local time Rx 13, the amplitude of the correction of each update is limited to a period T of the local oscillator Rx 8.

We then obtain:

Tupdate <1/abs([Frx-Ftx]max)

With abs representing the <<absolute value>> function,

Frx and Ftx representing respectively the frequencies of the local time Rx (generated by the oscillator 8) and of the send clock Tx. Samples of the clock Tx are transmitted via the 90 KHz time labels transported in the RTP packets.

The module 17 estimates the advance or the delay of the local clock Rx with respect to the send clock Tx.

The estimation of the advance or of the delay is deduced from the sign of the aggregate of the instantaneous discrepancies measured between the values of the time labels contained in the packets received and the local clock Rx 8 and performed by the accumulator 16. The aggregate is calculated over the packets received between two decision instants Tupdate. A reset to zero (by the signal RTZ) of the module 16 is done at each Tupdate.

The module 17 generates the signals 21 JUMP, 22 FREEZE and 23 INIT intended for a module 18 for setting the local time counter to time.

The local time counter Rx represents the phase of the slaved time Rx. This phase is compared (15) with the phase sample transported by the time label of the RTP packet.

The signal JUMP 21 is activated when the local time base Rx lags with respect to the send clock Tx. We thus advance the clock Rx.

The signal FREEZE 22 is activated when the local time base Rx leads with respect to the send clock Tx. We therefore delay the clock Rx.

The module 17 activates the signals 21 JUMP, 22 FREEZE, 23 INIT and 20 RTZ with a periodicity of Tupdate.

When a variation in the network transmission delay exceeds the compensation capacity IPDV of the buffer memory 6, the local time counter 18 is reinitialised by activating the signal INIT. The reinitialisation value is the value of the time label of the packet received.

The module 18 receives as input the signals 21 JUMP, 22 FREEZE and 23 INIT.

The module 18 sets the local time counter 18 to time.

The signal JUMP causes an incrementation by 2 of the local time counter, i.e. 1 clock tick: Rx+1 jump=2.

The signal FREEZE disables the incrementation of the local time counter i.e. 1 clock tick: Rx−1 freeze=0.

Between two decision instants Tupdate, the local time counter 18 is incremented in a regular manner at the timing of the frequency of the local clock Rx 8.

The counter 18 integrates (in the mathematical sense) the clock Rx (8) and the corrections emanating from the jump 21 and freeze 22 signals. It therefore provides the new local time 13 to the differentiator 9.

FIGS. 4 and 5 represent an improvement of the device described in FIG. 3.

This improvement makes it possible to improve the convergence time on start-up by adding a fast convergence module in the form of an estimator 24.

Fast convergence appreciably reduces the latching time of the timing recovery system.

The estimator 24 performs a learning phase as indicated in FIG. 5. Once the learning phase has terminated, we go to a phase for correcting the mean delay as indicated in FIG. 4.

The learning phase calls upon the theory of estimation. Any estimator of the mean, in the mathematical sense of the term, is appropriate for carrying out the estimation function of the module 24. The calculation of the experimental mean is, for example, a perfectly appropriate unbiased estimator known to the person skilled in the art.

The estimated value of the mean delay, as calculated by the estimator 24, is subtracted from the results of the input subtractor 15. The module 15 can also be called a phase comparator since the samples reaching it are two phases.

The RTP packets carry a 90 KHz time label which is a sample of the clock Tx at 27 mHz.

The signal 13 (phase of the slaved clock Rx) is sampled upon receipt of an RTP packet.

The output 19 of the subtractor determines a phase variation or delay. This delay is also referred to as the phase error since the phase of the slaved signal does not exactly follow the phase contained in the RTP packets.

The estimator 24 aims to calculate this mean delay at the start-up of the slaving. The module 30 drives the estimator. It counts the first n packets received by the slaving. Once the n packets have been received, the module 30 delivers an end-of-estimation signal which validates the calculation of the arithmetic mean. In order to simplify the hardware implementation, n can be chosen from among the powers of 2.

The number n of samples is determined by the maximum tolerated estimation error. This number n depends on the context in which the device is used and in particular on the slaving and on the performance desired. The theory of estimation and in particular the application of Studdent's law allow fast determination of the number of samples n to be taken into account. In the preferred embodiment, n is fixed at 8192.

During the first n packets, the system accumulates the phase errors so as to obtain the mean thereof and store it in the module 24.

The module 32 tailors the value of the time label of the RTP packet (sample at 90 KHz) to obtain a coherency of value with the local time counter Rx at reception.

A module 26 generates a sampling clock at 100 Hz, obtained by dividing the 27 MHz clock used for the local clock Rx 8. This clock generated by the module 26 allows edge-based triggering of the taking of decisions by the module 17 and makes it possible to sample the digital filter 31 described in FIG. 6 when it is active.

The phase correction corresponds to the subtraction of the signal FREEZE (22) from the signal Jump (21). This correction is then applied via the adder 28 to the counter 18 driven by the local clock. If during a clock tick, a phase correction is decided, i.e. a jump or a freeze, the counter is increased by the value 1+x with x strictly positive (+1) or negative (−1). X may also be a multiple of 1 so as to increase the gain of the slaving.

FIG. 6 represents an improvement of the module 7 for regenerating the clock of FIG. 2 making it possible to minimise the phase noise.

Specifically, the invention is based on a non-linear kernel. One of the properties of non-linear systems is to decorrelate the output noise from the input noise. The concept of noise should be taken in the probabilistic sense. It entails unpredictable variations of the input and output signals, only the expectancies and variances of which are known. The input noise is the network jitter applied to the RTP packets. The output noise is related to the decision errors (jumps or freezes) of this non-linear slaving. This introduces decision noise which is phase noise. This phase noise may turn out to be greater than the stability requirements of certain standards, such as the MPEG standard for example.

This embodiment therefore proposes that a digital processing of the signal upstream and/or downstream of the clock recovery device be performed so as to limit the propagation of the phase noise to the components desired alone.

The device of FIG. 6 therefore comprises a digital low-pass filter 31.

The digital low pass filter 31 may be of the IIR or FIR type.

The slope of the filter 31 is determined as a function of what is desired by the application.

In the case of MPEG for example, the objective to be achieved is a frequency drift. In this case, an attenuation of 40 dB/dec or a slope of −2 is necessary.

The pole or poles of the filter 31 are positioned in such a way that the amplitude LF of the unwanted phase modulation (i.e. the phase noise) is on the one hand tolerated by the phase modulation template in its low frequency part (LF), and that the cut-off frequency is at the intersection of the low frequency phase modulation amplitude and of the specified slope of the filter (for example−2 for a drift accepted within the MPEG framework).

Two notable values are often used:
The limit between HF phase error (jitter) and LF phase error (wander) lies at 10 mHz (phase modulation frequency)
The amplitude of the phase error in the HF part (jitter>10 mHz) is less than or equal to 500 ns.

Figure 1:
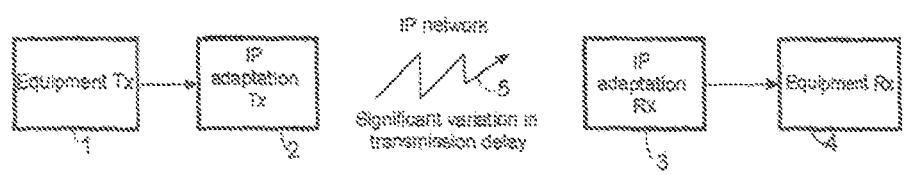
Figure 2:
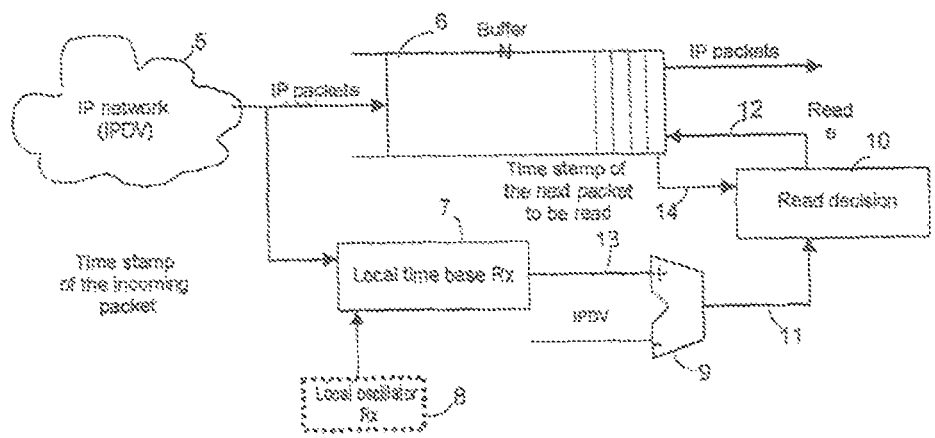
Figure 3:
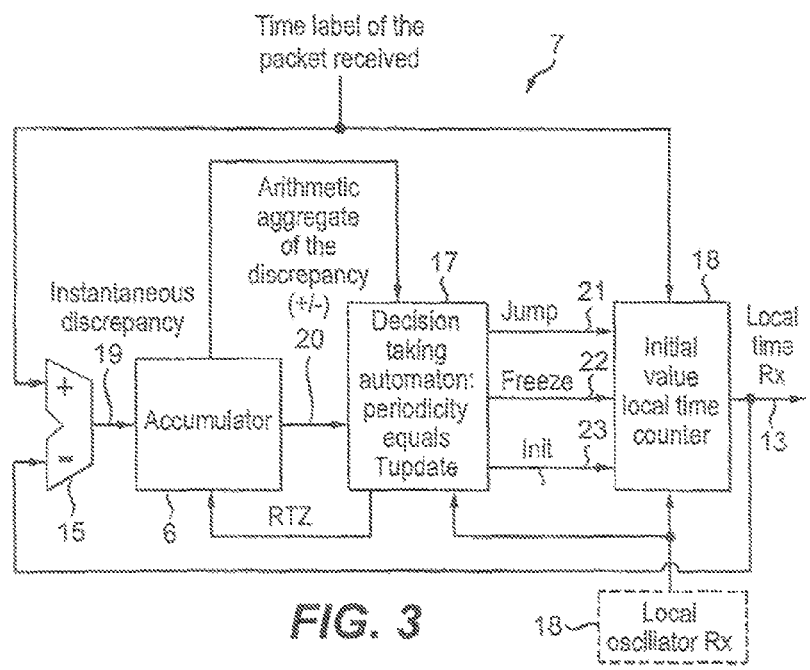
Figure 4:
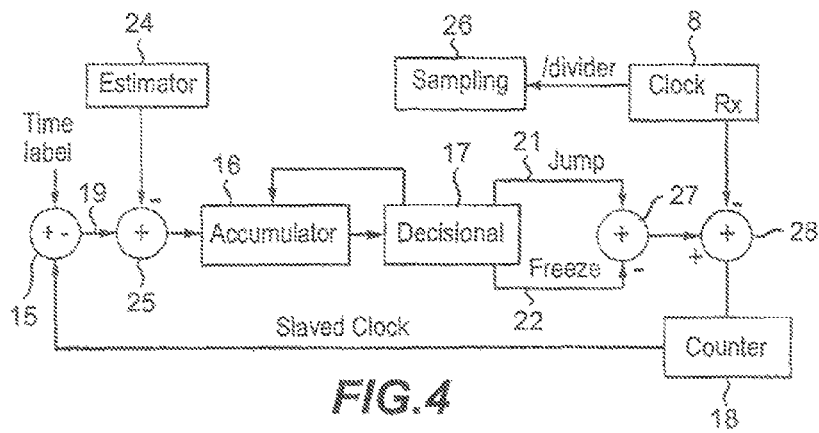
Figure 5:
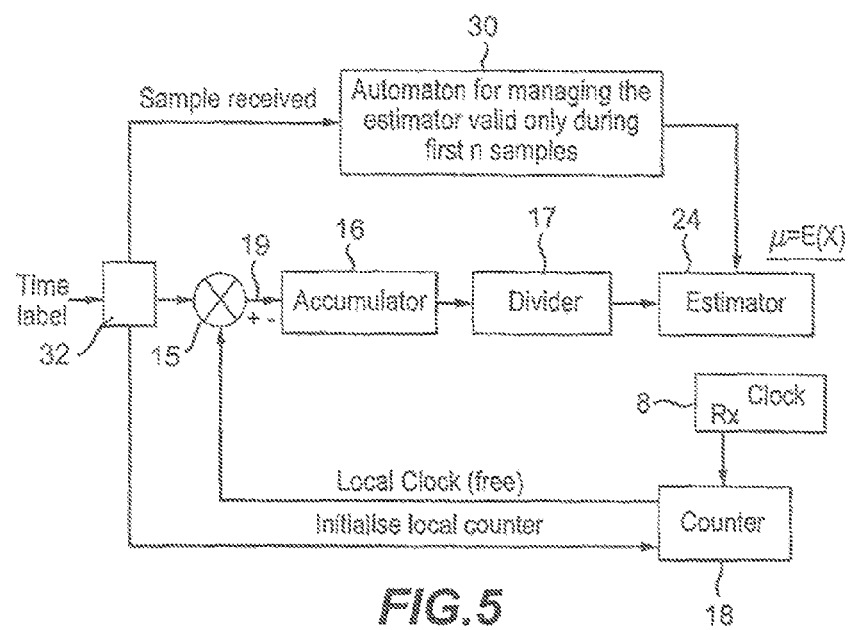
Figure 6:
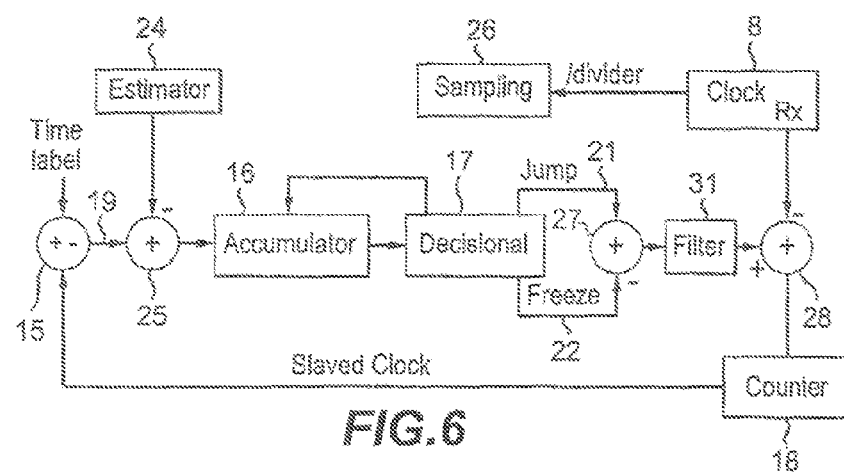
Figure 7:
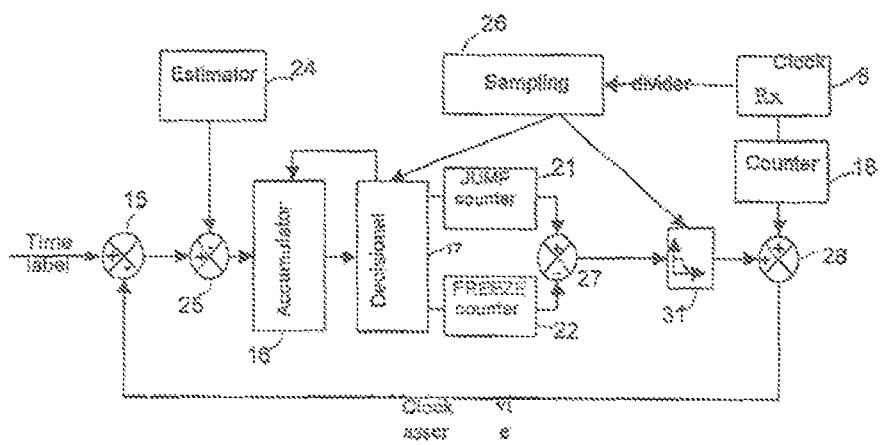
FIG. 7 represents a second embodiment of the improved device described in FIG. 6, the counter being placed differently.
Figure 9:
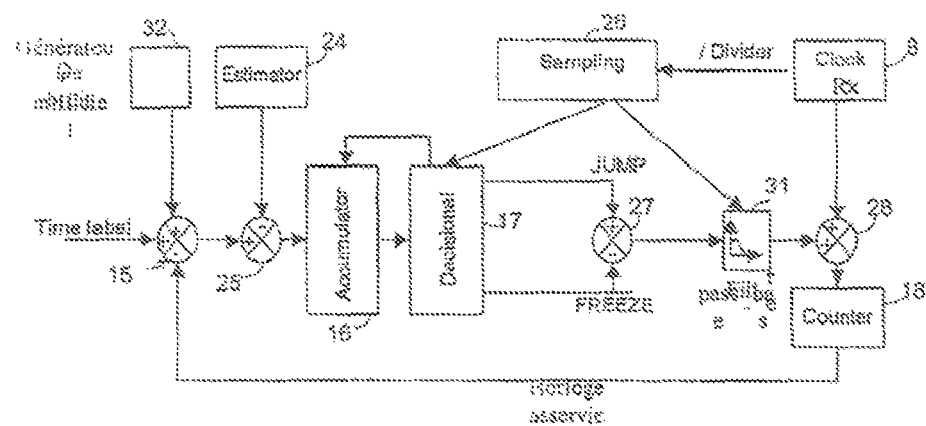
Figure 8:
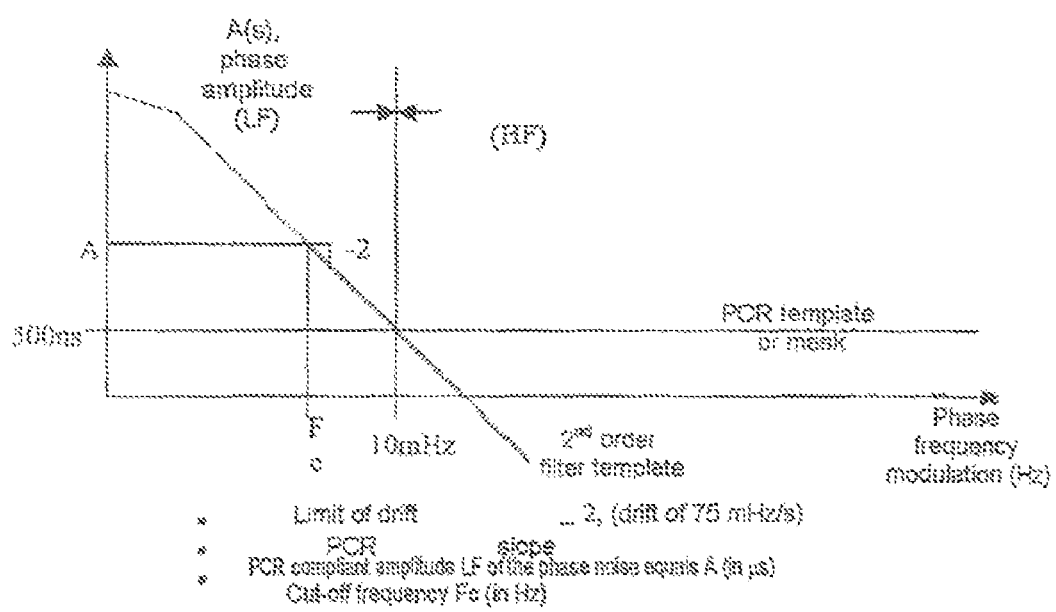
FIG. 8 represents the template of an example of the low-pass filter that can be used in FIGS. 6 and 7 applied to devices complying with the MPEG-2 standard. The cut-off frequency is determined in such a way that the amplitude LF of the phase error (expressed in seconds) is compatible with the phase diagram of the MPEG-2 standard.
Figure 10:
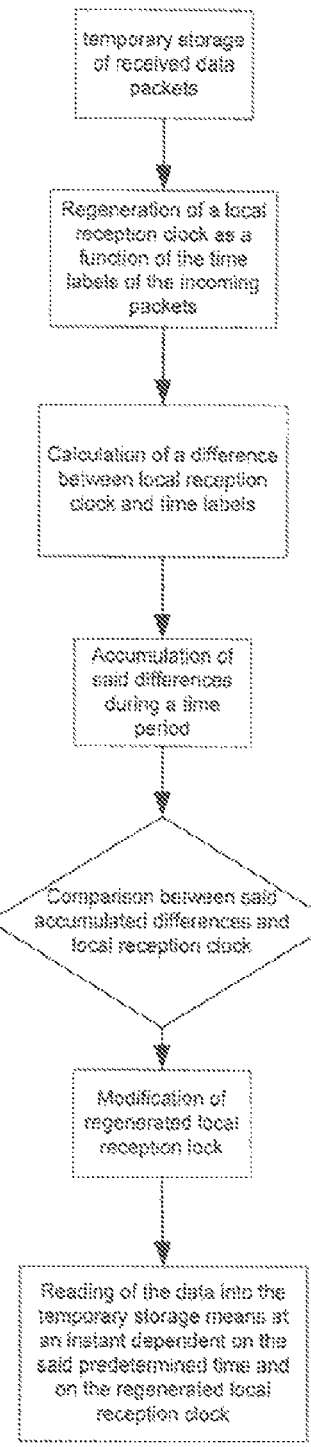

A second upstream processing may be included so as to allow optimal operation of the filter regardless of the input noise of the system. Accordingly, FIG. 9 proposes another improvement of the invention including an artificial noise generating module 32.

The module 32 is disposed at the input of the device and allows optimal operation of the filter regardless of the input noise of the system. The addition of artificial noise makes it possible to stabilise the operation of the slaving according to a maximum noise criterion. Since the slaving is non-linear, the input noise is not carried forward directly to the output. The addition of artificial noise does not modify the overall performance but limits the overall excursion of the noise. If the artificial noise has the same power as the input noise, the variations are limited within a factor of 2 instead of a variation in level of several decades on a logarithmic scale. If the variance of the artificial noise is equal to the variance of the input noise, the excursion of the noise at the input varies in a ratio of 2. The excursion of the noise varies from the variance of the artificial noise (no network jitter) to the sum of the variances of the artificial and network noise., The role of the artificial noise generator is to superimpose random noise on the input noise of the system so as to stabilise the native pole of the slaving and to distance it from the poles of the low-pass filter. Another purpose of the artificial noise is also to stabilise the performance of the slaving regardless of the conditions of deployment.

Any generator of artificial noise defined by its expectation and its variance may be used. In the preferred embodiment, a generator of noise exhibiting a uniform law is used.

According to control theory, the maximum stabilisation of the poles is achieved when the variance of the artificial noise is equal to the variance of the input noise.

The addition of artificial noise also makes it possible to control the transient start-up phases of such a system and to render them predictable regardless of the input noise.

It should be noted that the various cited improvements of the invention may be combined together or used separately.

The invention claimed is:

1. A device for temporal slaving in a packet data transmission network,
   the device receiving data packets,
   wherein each incoming data packet comprises a time label,
   the device comprising:
   a local reception clock;
   a means of temporary storage for receiving said packets from said network,
   said storage having a storage capacity for recording data received for a predetermined time, said storage capacity dependent on characteristics of the network,
   a means for regenerating the local reception clock as a function of the time labels of the incoming packets,
   a means for reading the data in the means of temporary storage at an instant dependent on said predetermined time and on the regenerated local reception clock;
   wherein the means for regenerating the local reception clock comprises
   a differentiator for calculating a difference between the time labels and the regenerated local reception clock,
   a means for accumulating said differences between the time labels of the incoming data packets and the local reception clock during a period of time and
   a decision means for comparing said accumulated differences and the local clock and modifying the regenerated local reception clock according to said comparison.

2. Device according to claim 1, wherein the means of reading the data in the means of temporary storage are adapted for reading the data in the means of temporary storage when the difference between the said predetermined time and the regenerated local clock is greater than the value of the time label of the next packet to be output from the means of temporary storage.

3. Device according to claim 1 additionally comprising a means of reducing the convergence time on start-up.

4. Device according to claim 1 additionally comprising a means of reducing the phase noise.

5. Device according to claim 3, wherein the means of reducing the phase noise comprises a digital low-pass filter.

6. Device according to claim 1 additionally comprising a means of generating artificial noise.

7. Method of temporal slaving in a device of a packet data transmission network,
   the device receiving data packets, each data packet comprising a time label,
   said device comprising a local reception clock,
   said method comprising:
   a step of temporary storage of the packets received from said network, said storage having a storage capacity for recording data received for a predetermined time, said storage capacity dependent on characteristics of the network,
   a step of regenerating a local reception clock as a function of the time labels of the incoming packets,
   a step of reading the data in the temporary storage at an instant dependent on said predetermined time and on the regenerated local reception clock,
   wherein during the regenerating step:
   calculating the difference between the time label and the regenerated local reception clock,
   accumulating differences between the time labels of the incoming data packets and the local reception clock during a period of time and
   comparing said accumulated differences and the local reception clock and modifying the regenerated local reception clock according to said comparison.

* * * * *